(12) United States Patent
Chen et al.

(10) Patent No.: US 12,361,040 B2
(45) Date of Patent: Jul. 15, 2025

(54) QUESTION ANSWERING METHOD FOR QUERY INFORMATION, AND RELATED APPARATUS

(71) Applicant: Beijing Baidu Netcom Science Technology Co., Ltd., Beijing (CN)

(72) Inventors: Hao Chen, Beijing (CN); Runmei Zhao, Beijing (CN); Jizhou Huang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 336 days.

(21) Appl. No.: 17/974,409

(22) Filed: Oct. 26, 2022

(65) Prior Publication Data
US 2023/0049839 A1 Feb. 16, 2023

(30) Foreign Application Priority Data
Jan. 11, 2022 (CN) .......................... 202210028426.2

(51) Int. Cl.
*G06F 16/33* (2025.01)
*G06F 16/3332* (2025.01)
*G06F 16/3349* (2025.01)
*G06F 40/205* (2020.01)

(52) U.S. Cl.
CPC ...... *G06F 16/3349* (2019.01); *G06F 16/3334* (2019.01); *G06F 40/205* (2020.01)

(58) Field of Classification Search
USPC ............................................... 704/8–10, 257
See application file for complete search history.

(56) References Cited

U.S. PATENT DOCUMENTS

| 9,542,447 B1* | 1/2017 | Brennan | G06F 16/24564 |
| 2016/0180726 A1* | 6/2016 | Ahuja | G06N 5/022 |
| | | | 434/322 |
| 2017/0091188 A1* | 3/2017 | Allen | G06F 16/9024 |
| 2018/0307687 A1* | 10/2018 | Natkin | G06F 16/248 |

(Continued)

FOREIGN PATENT DOCUMENTS

| CN | 110750633 A | 2/2020 |
| CN | 111767385 A | 10/2020 |

(Continued)

OTHER PUBLICATIONS

Intelligent Annotation and Knowledge Graph Construction System for Tourism Service, 2021.

*Primary Examiner* — Leonard Saint-Cyr
(74) *Attorney, Agent, or Firm* — Knobbe, Martens, Olson & Bear, LLP

(57) ABSTRACT

The present disclosure provides a question answering method and apparatus for query information. The method may include: receiving query information input by a user, and analyzing a query target comprised in the query information; recalling candidate answers from a pre-generated knowledge graph based on the query target, where the knowledge graph is constructed based on inherent data in a map database and dynamic data of historical users, and the dynamic data includes at least one of comment data, search data, or spatiotemporal big data; and returning, in response to that there is a target answer whose matching degree with the query target exceeds a preset threshold in the candidate answers, the target answer to the user.

13 Claims, 8 Drawing Sheets

(56) References Cited

U.S. PATENT DOCUMENTS

| | | | |
|---|---|---|---|
| 2021/0012217 A1* | 1/2021 | Croutwater | G06F 16/3329 |
| 2021/0012218 A1* | 1/2021 | Croutwater | G06F 40/279 |
| 2021/0201174 A1 | 7/2021 | Huang et al. | |
| 2021/0216577 A1* | 7/2021 | Xiao | G06F 16/3329 |

FOREIGN PATENT DOCUMENTS

| | | |
|---|---|---|
| CN | 112000700 A | 11/2020 |
| CN | 112199478 A | 1/2021 |
| WO | 2021/164618 A1 | 8/2021 |

\* cited by examiner

QUESTION ANSWERING METHOD FOR QUERY INFORMATION, AND RELATED APPARATUS

RELATED APPARATUS

This patent application claims the priority of Chinese Patent Application No. 202210028426.2, filed on Jan. 11, 2022, and entitled "Question Answering Method for Query Information, Related Apparatus and Computer Program Product," the disclosure of which is incorporated by reference herein in its entirety.

TECHNICAL FIELD

The present disclosure relates to the field of computer technologies, in particular to the technical field of artificial intelligence such as knowledge graphs, deep learning, and intelligent recommendation, and more particularly, to a question answering method and apparatus for query information, an electronic device, a computer readable storage medium, and a computer program product.

BACKGROUND

With the rapid development of Internet technology, map navigation becomes an indispensable tool for people's daily travel. For example, when a user enters an unfamiliar environment (such as a city, a country or a shopping mall) and does not know how to get to a destination, he/she usually turns on the map navigation function on a terminal.

SUMMARY

Embodiments of the present disclosure provide a question answering method and apparatus for query information, an electronic device, and a computer readable storage medium.

According to a first aspect of the present disclosure, a question answering method for query information is provided, which includes: receiving query information input by a user, and analyzing a query target included in the query information; recalling candidate answers from a pre-generated knowledge graph based on the query target, where the knowledge graph is constructed based on inherent data in a map database and dynamic data of historical users, and the dynamic data includes at least one of comment data, search data or spatiotemporal big data; and returning, in response to that there is a target answer whose matching degree with the query target exceeds a preset threshold in the candidate answers, the target answer to the user.

According to a second aspect of the present disclosure, a question answering apparatus for query information is provided, which includes: a query target obtaining unit, configured to receive query information input by a user, and analyze a query target included in the query information; a candidate answer recalling unit, configured to recall candidate answers from a pre-generated knowledge graph based on the query target, where the knowledge graph is constructed based on inherent data in a map database and dynamic data of historical users, and the dynamic data includes at least one of comment data, search data or spatiotemporal big data; and an answer returning unit, configured to return, in response to that there is a target answer whose matching degree with the query target exceeds a preset threshold in the candidate answers, the target answer to the user.

According to a third aspect of the present disclosure, a method for generating a knowledge graph is provided, which includes: extracting inherent data of each target object from a map database, where the inherent data includes at least one of contact numbers, business hours, geographic coordinates, or an industry of the target object; generating a first knowledge graph corresponding to each target object using the inherent data corresponding to each target object; adding dynamic data nodes of at least one information type to each first knowledge graph; obtaining dynamic data corresponding to the target object, and extracting associated information from each piece of the dynamic data based on the information type, where the dynamic data includes at least one of comment data of historical users, search data, or spatiotemporal big data, and content included in the associated information is related to the information type; and adding the information type corresponding to the associated information to each first knowledge graph to generate a second knowledge graph.

According to a fourth aspect of the present disclosure, an apparatus for generating a knowledge graph is provided, which includes: an inherent data acquiring unit, configured to extract inherent data of each target object from a map database, where the inherent data includes at least one of: contact numbers, business hours, geographic coordinates, or an industry of the target object; a first knowledge graph generating unit, configured to generate a first knowledge graph corresponding to each target object using the inherent data corresponding to each target object; a dynamic data node adding unit, configured to add dynamic data nodes of at least one information type to each first knowledge graph; an associated information extracting unit, configured to obtain dynamic data corresponding to the target object, and extract associated information from each piece of the dynamic data based on the information type, where the dynamic data includes at least one of: comment data of historical users, search data, or spatiotemporal big data, and content included in the associated information is related to the information type; and a second knowledge graph generating unit, configured to add the information type corresponding to the associated information to each first knowledge graph to generate a second knowledge graph.

According to a fifth aspect of the present disclosure, an electronic device is provided, which includes: at least one processor; and a memory communicatively connected to the at least one processor. The memory stores instructions executable by the at least one processor, and the instructions, when executed by the at least one processor, cause the at least one processor to perform the question answering method for query information described in any of implementations of the first aspect or the method for generating a knowledge graph described in any of implementations of the third aspect.

According to a sixth aspect of the present disclosure, a non-transitory computer readable storage medium storing a computer instruction is provided. The computer instructions are used to cause the computer to perform the question answering method for query information described in any of implementations of the first aspect or the method for generating a knowledge graph described in any of implementations of the third aspect.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

Other features, objectives and advantages of the present disclosure will become more apparent upon reading the detailed description of non-limiting embodiment with reference to the following accompanying drawings.

FIG. 1 is an exemplary system architecture that the present disclosure may be applied to;

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described here without departing from the scope and spirit of the present disclosure. Similarly, for clearness and conciseness, descriptions of well-known functions and structures are omitted in the following description. It should be noted that the embodiments of the present disclosure and features in the embodiments may be combined with each other on a non-conflict basis.

In addition, in the technical solution of the present disclosure, the acquisition, storage, use, processing, transmission, provision and disclosure of the user personal information involved are in compliance with relevant laws and regulations, and do not violate public order and good customs.

Figure 1:
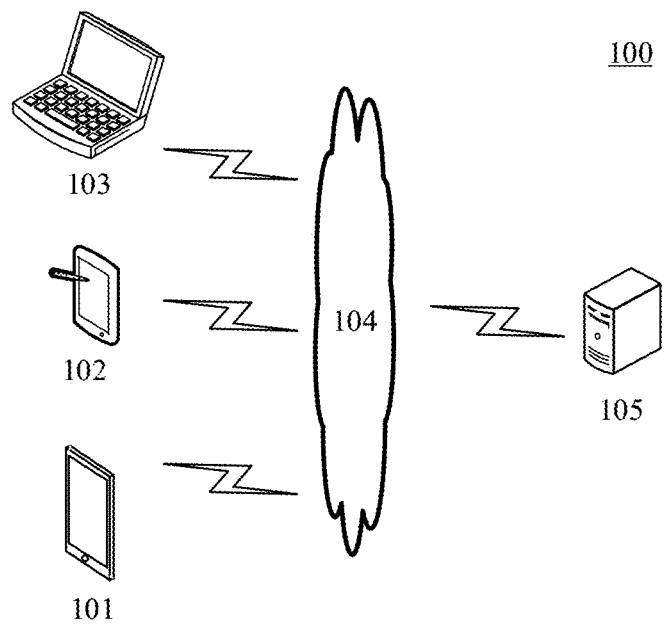

FIG. 1 illustrates an exemplary system architecture 100 to which embodiments of a question answering method and apparatus for query information, an electronic device and a computer readable storage medium of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, 103, and the server 105. The network 104 may include various types of connections, such as wired or wireless communication links, or optical cables.

A user may use the terminal devices 101, 102, 103 to interact with the server 105 via the network 104 to receive or send messages, or the like. Various applications for implementing information communication between the terminal devices 101, 102, 103 and the server 105 may be installed, such as navigation applications, online question and answer applications, or instant messaging applications.

The terminal devices 101, 102, and 103 and the server 105 may be hardware or software. When the terminal devices 101, 102, and 103 are hardware, they may be various electronic devices having display screens, including but not limited to smart phones, tablet computers, laptop computers, desktop computers, or the like; when the terminal devices 101, 102, and 103 are software, they may be installed in the above listed electronic devices. The terminal devices 101, 102, and 103 may be implemented as a plurality of software or software modules, or may be implemented as a single software or software module, which is not limited herein. When the server 105 is hardware, it may be implemented as a distributed server cluster composed of a plurality of servers, or may be implemented as a single server; when the server 105 is software, it may be implemented as a plurality of software or software modules, or may be implemented as a single software or software module, which is not limited herein.

The server 105 may provide various services through various built-in applications. Taking a navigation application that may provide an intelligent question-answering service for query information as an example, the server 105 may achieve the following effects when running the navigation application. First, after obtaining query information input by a user from the terminal devices 101, 102, and 103 via the network 104, analyzing a query target included in the query information is performed. Then the server 105 recalls candidate answers from a pre-generated knowledge graph based on the query target, where the knowledge graph is constructed based on inherent data in a map database and dynamic data of historical users, and the dynamic data includes at least one of comment data, search data or spatiotemporal big data. Finally, the server 105 responds, if there is a target answer whose matching degree with the query target exceeds a preset threshold in the candidate answers, and returns the target answer to the user.

The knowledge graph may be generated by a built-in knowledge graph generation application on the server 105 according to steps as follows. First, the server 105 extracts inherent data of each target object from a map database, where the inherent data includes at least one of contact numbers, business hours, geographic coordinates, or an industry of the target object; next, the server 105 generates a first knowledge graph corresponding to each target object using the inherent data corresponding to each target object; further, the server 105 adds dynamic data nodes of at least one information type to each first knowledge graph; then, the server 105 obtains dynamic data corresponding to the target object, and extracts associated information from each piece of the dynamic data based on the information type, where the dynamic data includes at least one of comment data of historical users, search data, or spatiotemporal big data, and content included in the associated information is related to the information type; and finally, the server 105 adds the information type corresponding to the associated information to each first knowledge graph to generate a second knowledge graph.

It should be noted that the query information may be pre-stored locally in the server 105 in various methods, in addition to being obtained from the terminal devices 101, 102 and 103 via the network 104. Therefore, when the server 105 detects that the data is already stored locally (for example, the query information pre-configured by the navigation application before starting processing), it may choose to obtain the data directly from the local. In this case, the exemplary system architecture 100 may also not include the terminal devices 101, 102, 103 and the network 104.

Since using the knowledge graph to recall the candidate answers requires many computing resources and strong computing power, the question answering method for query information provided in subsequent embodiments of the present disclosure is generally performed by the server 105 having strong computing power and many computing resources, correspondingly, the question answering apparatus for query information is generally also set in the server 105. However, it should also be noted that, when the terminal devices 101, 102, and 103 also have computing power and computing resources that meet the requirements, the terminal devices 101, 102, and 103 may also complete the above various operations that are handed over to the server 105 through the navigation applications installed thereon, and then output a same result as the server 105. Especially, when there are multiple terminal devices having different computing power at the same time, and the navigation applications determine that the terminal devices have strong computing power and more computing resources left, the terminal device may be used to perform the above operations, so as to appropriately reduce a computing pressure of the server 105. Correspondingly, the question answering apparatus for query information may also be set in the terminal devices 101, 102 and 103. In this case, the example system architecture 100 may also not include the server 105 and the network 104.

It should be understood that the numbers of terminal devices, networks, and servers in FIG. 1 are merely illustrative. Any number of terminal devices, networks, and servers may be provided according to implementation needs.

Figure 2:
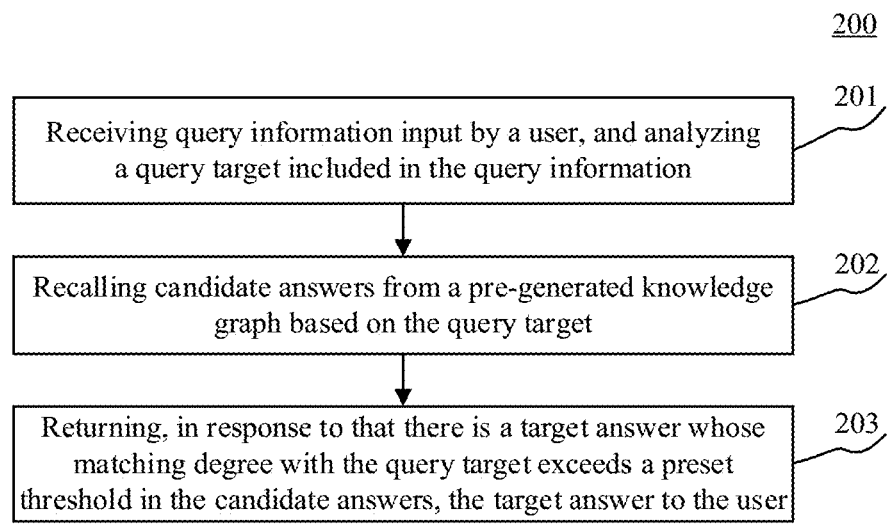
FIG. 2 is a flowchart of a question answering method for query information according to an embodiment of the present disclosure.

Referring to FIG. 2, FIG. 2 is a flowchart of a question answering method for query information according to an embodiment of the present disclosure, where a flow 200 includes the following steps.

Step 201: receiving query information input by a user, and analyzing a query target included in the query information.

In the present embodiment, after receiving the query information input by the user, an executing body (for example, the server 105 shown in FIG. 1) of the question answering method for query information may analyze the query target included in the query information to understand a query purpose of the user. For example, the query information input by the user may be "how to get to place A", then based on the query information, it may be determined that the query targets included in the query information are "place A" and "transportation to get to place A".

In practice, when the query purpose included in the query information input by the user is traffic routes to get to a specific place, if a starting point cannot be analyzed from the query information, then usually, after sending a permission request to the user, a current location of the user is used as the starting point, and a traffic route of "from the current location of the user to the specific place" is determined as the query target.

Further, in some embodiments, for the query target, it is also possible to configure a relationship between the query target and the query information, and content in the query target, so as to eliminate query information and/or query targets with obvious errors in search logic. Also using the above example, when it is pre-determined that there is no "subway facility" in "place A", the query information and/or query target is configured to block query information such as "how to take the subway to place A", and query targets such as "subway line to place A", in order to reduce resource waste of the executing body of the question answering method for query information.

It should be noted that the content in the query target may also be pre-configured locally in the executing body, so that after receiving the query information input by the user, the query information may be subsequently processed by means of semantic analysis, normalization, etc., and based on a processing result corresponding to the preconfigured query purpose, the corresponding query target may be determined, so as to improve an efficiency of analyzing the query target included in the query information.

In this case, in some embodiments, the preconfigured query target may be obtained by the executing body directly from a local storage device, or may be obtained from a non-local storage device (for example, the terminal devices 101, 102, and 103 shown in FIG. 1). The local storage device may be a data storage module set in the executing body, such as a server hard disk. In this case, the preconfigured query target may be quickly read locally; the non-local storage device may also be any other electronic device that is used to store data, such as some user terminals, in this case, the executing body may obtain the required preconfigured query target by sending an acquisition command to the electronic device.

Step 202: recalling candidate answers from a pre-generated knowledge graph based on the query target.

In the present embodiment, after obtaining the query target based on the above step 201, the executing body may recall the candidate answers related to the query target from the pre-generated knowledge graph based on the query target. Knowledge Graph, known as knowledge field visualization or knowledge field mapping map in the field of library and information, which is a series of various graphs showing a knowledge development process and structural relationship, and uses visualization technology to describe knowledge resources and their carriers, mines, analyzes, constructs, draws and displays knowledge and the interrelationships therebetween.

The knowledge graph is constructed based on inherent data in a map database and dynamic data of historical users, where the dynamic data includes at least one of comment data, search data or spatiotemporal big data. The inherent data may usually include long-term unchanged, externally-provided related data for objects included in the map database. While the dynamic data is relevant data, based on historical user feedback and corresponding to each historical user, provided by different historical users, which may be the same as or different for different historical users and may change at any time, as well as statistical data generated from map spatiotemporal big data such as access and interaction information for historical users existing in different maps in specific periods (seasons), and/or for specific objects in the map database. For example, the inherent data may include data such as business hours of each object, and geographic location of each object, while the dynamic data is data determined based on comment information of different historical users, and may be reflected in per capita consumption, satisfaction, congestion, the number of people visiting a specific object in the map database in a specific season, etc.

For example, when the query target is "how to park in place A", based on the query target, "there are two parking lots at the south gate of place A, each with 500 parking spaces" obtained based on the inherent data may be recalled from the knowledge graph as a candidate answer, as well as "you may start from the south gate of place A and go south for 500 meters, and park on the side of the road" obtained based on the dynamic data may be recalled as a candidate answer.

Step 203: returning, in response to that there is a target answer whose matching degree with the query target exceeds a preset threshold in the candidate answers, the target answer to the user.

In the present embodiment, when there are candidate answers recalled based on the above step 202, whether the candidate answer is used as the target answer is determined based on the matching degree of the candidate answer with the query target, where the matching degree may be determined based on a query accuracy. Also, based on the above example, when the query target is "regular parking lot in place A", both "there are two parking lots at the south gate of place A, each with 500 parking spaces" and "you may start from the south gate of place A and go south for 500 meters, and park on the side of the road" may be recalled as the candidate answers, however, since "park on the side of the road" is not a regular parking lot, the matching degree between this candidate answer and the query target does not meet the requirement, then "there are two parking lots at the south gate of place A, each with 500 parking spaces" is returned to the user as the target answer.

In some embodiment, after word segmentation is performed on the content included in the query target, the number of word segmentation results included in the recalled candidate answer may be used as a basis for judging the matching degree. For example, when the query target is "how are the maple leaves in autumn in place A", word segmentation is performed and the word segmentation results obtained are "autumn", "place A" and "maple leaves". By checking whether each candidate answer contains the above word segmentation results, it may be determined whether the candidate answer is used as the target answer.

According to the question answering method for query information provided by this embodiment of the present disclosure, the knowledge graph may be constructed based on the inherent data in the map database and the dynamic data of the historical users, so that after receiving the query information input by the user, through the high-quality knowledge graph, the query information of the user is adaptively answered, improving response efficiency and quality of answering to the user.

In some alternative implementations of the present embodiment, the question answering method for query information further includes: pushing, in response to that there is no target answer whose matching degree with the query target exceeds the preset threshold in the candidate answers, the query information to an expert user; and returning a recommended answer returned by the expert user based on the query information to the user.

When the candidate answers recalled based on the knowledge graph do not include a target answer whose matching degree with the query target exceeds the preset threshold, the query information is pushed to the expert user, where the expert user is a specific user pre-configured based on the query information, the content in the query target, a type, or the like. Typically, the expert user is required to have the ability to answer the corresponding query information and the query target. When answers meeting the requirement cannot be recalled from the existing knowledge graph, the expert user returns the recommended answer based on the query information to the user, so as to provide the user with the answer by means of user collaboration.

In practice, the expert user may also be historical users who have input query information whose similarity with the above query information exceeds a requirement, historical users who have visited an address included in the query target, historical users who have sent and uploaded dynamic data, etc. Further, the expert user may be further selected based on information such as the number of historical answers, an adoption rate of recommended answers of the expert users, so as to find high-quality expert users to generate high-quality recommended answers.

In some alternative implementations of the present embodiment, the question answering method for query information further includes: adding the recommended answer to the knowledge graph corresponding to the query target.

In response to that the expert user returns the recommended answer, the recommended answer may be added to the knowledge graph corresponding to the query target, so as to realize dynamic update of the knowledge graph. By improving quality of the knowledge graph, a question-answering ability of the question answering method for query information is improved.

In some alternative implementations of the present embodiment, the question answering method for query information further includes: generating, in response to that the same query target is input by a plurality of different historical users within a preset period respectively, recommendation information based on the query target and the corresponding target answer; and sending the recommendation information to the user.

Within the preset period, if there are a plurality of different historical users who query and input the same query target respectively, the recommendation information may be generated based on the query target and the corresponding target answer that is finally obtained. The recommendation information usually presents the query target and the corresponding target answer at the same time, so that other users may directly learn the query information input by the historical users, the query target and the corresponding search result based on the recommendation information. In this way, it can not only present top query questions from historical users, so that the other users may learn hotspots of interest, but also directly provide the target answer for users who have the same query target requirements when they search in the future, thereby improving a search efficiency.

It should be understood that the above same query target may be determined by a preset similarity threshold. If a similarity between two query targets meets the preset similarity threshold requirement, the two query targets are determined to be the same query target.

In some alternative implementations of the present embodiment, the question answering method for query information further includes: obtaining the number of query targets corresponding to each piece of the recommendation information, and generating popularity information of each piece of the recommendation information; and the sending the recommendation information to the user, includes: sorting each piece of the recommendation information based on the popularity information, and pushing each piece of the recommendation information sequentially to the user according to a sorting result.

After the recommendation information is generated, the popularity information corresponding to the recommendation information may be determined based on the number of query targets when generating the recommendation information, that is, the number (number of times) of query targets obtained within the above preset period, and after sorting each piece of the recommendation information based on the popularity information, each piece of the recommendation information may be pushed to the user sequentially according to the sorting result, so that the user may understand a popularity relationship among multiple pieces of recommendation information based on the sorting result, thereby improving quality of the recommendation information obtained by the user.

Figure 3:
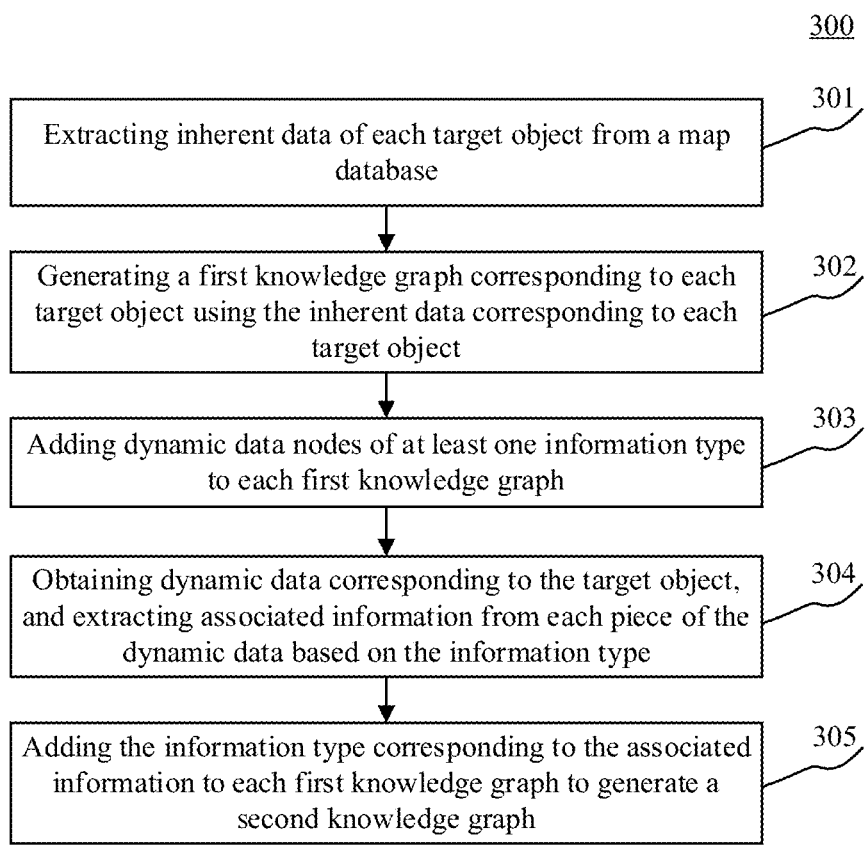
FIG. 3 is a flowchart of a method for generating a knowledge graph according to an embodiment of the present disclosure.

Referring to FIG. 3, FIG. 3 is a flowchart of a method for generating a knowledge graph according to an embodiment of the present disclosure, where a flow 300 includes the following steps.

Step 301: extracting inherent data of each target object from a map database.

In the present embodiment, the inherent data of each target object is extracted from the map database, and the target object is each landmark, place, or the like recorded in the map. Typically, in the existing map database construction method, each target object may be marked and determined in the way of point of interest (POI). In this regard, each POI may be used as the target object, where the inherent data represents naturally-existing, objective, and long-term unchanged data of each target object. Depending on a nature of the target object, contact numbers, business hours, geographic coordinates, industry, altitude, area, or the like, of the target object may be included in the inherent data.

Step 302: generating a first knowledge graph corresponding to each target object using the inherent data corresponding to each target object.

In the present embodiment, based on the inherent data obtained in the above step 301, based on content in the inherent data, the knowledge graph may be constructed corresponding to each target object. For example, the inherent data corresponding to target object A includes "business hours are 8:00-17:00", then "business hours"—"8:00-17:00" may be recorded in the knowledge graph corresponding to the target object A, to generate the first knowledge graph corresponding to the target object A.

Step 303: adding dynamic data nodes of at least one information type to each first knowledge graph.

In the present embodiment, in the first knowledge graph corresponding to each target object, the dynamic data nodes of at least one information type are respectively added, and content in the dynamic data nodes corresponds to a form and content of the target object. For example, when the target object is a restaurant, the dynamic data nodes may be taste, per capita consumer price, service experience, or the like.

In practice, the information type corresponding to the dynamic data nodes is usually determined based on content that the user pays attention to in each target object. The content of interest may be preset based on a service provider of the question answering method for query information, or may be obtained by analyzing and extracting content included in dynamic data of historical data obtained for one type of target objects and/or target objects with similar characteristics after collecting multiple pieces of dynamic data. For example, in five pieces of dynamic data obtained continuously, all of which are comments involving per capita consumption, so the information type may be determined as "per capita consumption" accordingly.

Step 304: obtaining dynamic data corresponding to the target object, and extracting associated information from each piece of the dynamic data based on the information type.

In the present embodiment, in each target object, each dynamic data corresponding to the target object may be obtained. Here, the dynamic data usually includes reports on the target object, comments made by historical users on the target object, a final target answer obtained by historical users using the target object as a query target, and statistical data of time, purpose, number of historical objects when historical users interact with the target object in spatiotemporal big data, and the like. The obtained dynamic data is extracted according to the information type determined in the above step 303, and the associated information related to the information type in the dynamic data is determined.

In some embodiments, when obtaining multiple pieces of associated information of the same information type, sorting and selection may further be performed based on semantic content therein, so as to present the associated information with the same semantics, or present a proportion of the associated information with different semantics, to provide further reference for the user.

Step 305: adding the information type corresponding to the associated information to each first knowledge graph to generate a second knowledge graph.

In the present embodiment, the associated information extracted in the above step 304 is respectively added to the dynamic data nodes corresponding to each information type in the first knowledge graph based on the information type, so as to generate the second knowledge graph corresponding to each target object. The second knowledge graph includes inherent data of the target object obtained based on the inherent data in the map data and the dynamic data corresponding to the target object.

In some embodiments, if there are multiple target objects, after the knowledge graph is constructed for each of the target objects based on the inherent data and the dynamic data of each of the target objects, the knowledge graphs of these target objects may also be aggregated, and relationships and connections among the different target objects may be established in an aggregation result to form a more complete knowledge graph, in order to improve a recall rate of candidate answers in a subsequent process of using the knowledge graph to perform question answering on the query information.

The method for generating a knowledge graph provided by this embodiment of the present disclosure, may integrate the inherent data and the dynamic data to construct the knowledge graph for intelligent question answering, so as to collect multi-dimensional and multi-perspective information for different target objects, and achieve higher-quality content recall.

In some alternative implementations of the present embodiment, the method for generating a knowledge graph further includes: obtaining keyword information corresponding to each of the dynamic data nodes. The extracting associated information from each piece of the dynamic data based on the information type, includes: performing word segmentation processing on each piece of the dynamic data; and extracting, in response to that a word segmentation result of the dynamic data includes the keyword information, the dynamic data as the associated information of the information type of the dynamic data nodes corresponding to the keyword information.

The keyword information corresponding to each of the dynamic data nodes may also be pre-configured. For example, the dynamic data node is "per capita consumer price", and the corresponding keyword information may be configured as "consumption", "vegetable price", "average price", etc., so that after the dynamic data is obtained and the content in the dynamic data is processed by word segmentation, the keyword information and the word segmentation processing results are used to quickly locate the content in the dynamic data and the associated information associated with the information type in the dynamic data, so as to improve efficiency and accuracy of extracting the associated information from the dynamic data.

In some alternative implementations of the present embodiment, the method for generating a knowledge graph further includes: determining the information type of the dynamic data nodes based on an information type of query information of the historical users.

After collecting the query information of the historical users, operations such as semantic analysis, keyword extraction, or the like may be performed on the obtained query information to determine content queried by each piece of the query information, then to determine the information type corresponding to each piece of the query information, so as to collect the user's search content, preferences, etc. based on the query information of the historical users, determine the information type of the corresponding dynamic data nodes, and improve a collection quality.

In order to deepen understanding, the present disclosure further provides an implementation solution in combination with an application scenario. In this application scenario, user A uses terminal device A to send query information to server B. Specific steps are as follows.

Figure 4A:
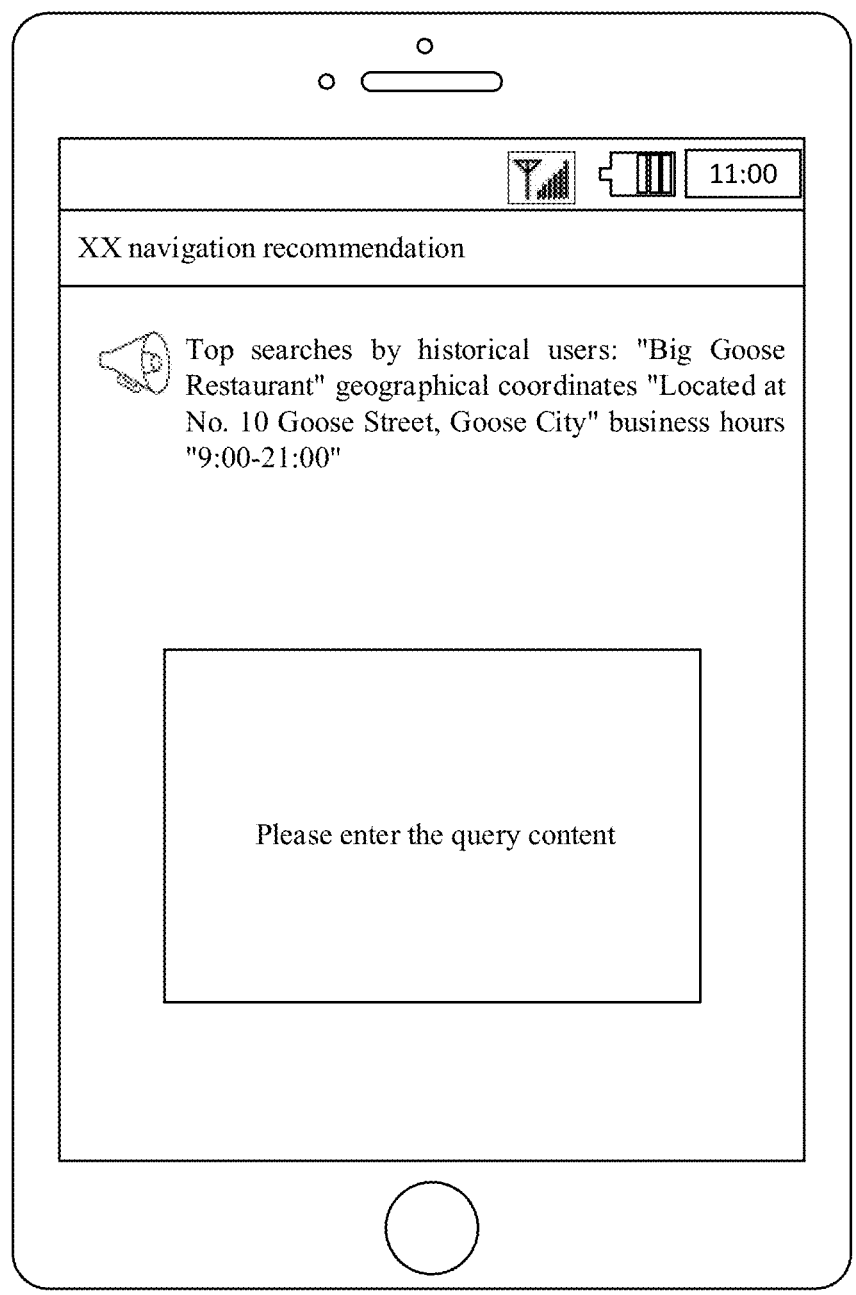
FIGS. 4A, 4B, 4C, 4D, and 4E are schematic diagrams of effects of the question answering method for query information in an application scenario according to an embodiment of the present disclosure.

In a preset period, a number of different historical users have respectively input the same query target "geographical coordinates and business hours of Big Goose Restaurant" to the server B. Based on the query target and the corresponding target answer: the geographical coordinates are "located at No. 10 Goose Street, Goose City", the business hours are "9:00-21:00", recommendation information is generated and presented in the terminal device A used by the user A as shown in FIG. 4A.

The user A uses the terminal device A to send query information "Is the food in Big Goose Restaurant delicious? Is it expensive?" to the server B. After receiving the query information, the server B analyzes a query target included in the information as "food quality and price at Big Goose Restaurant".

The server B recalls candidate answers "50% of users think that the food quality is very good", "Recommending dish X" and "Consumption: per capita consumption 90-110 yuan" from a pre-generated knowledge graph based on the query target "food quality and price at Big Goose Restaurant".

A construction process for the target object "Big Goose Restaurant" in the knowledge graph is as follows.

Figure 4B:
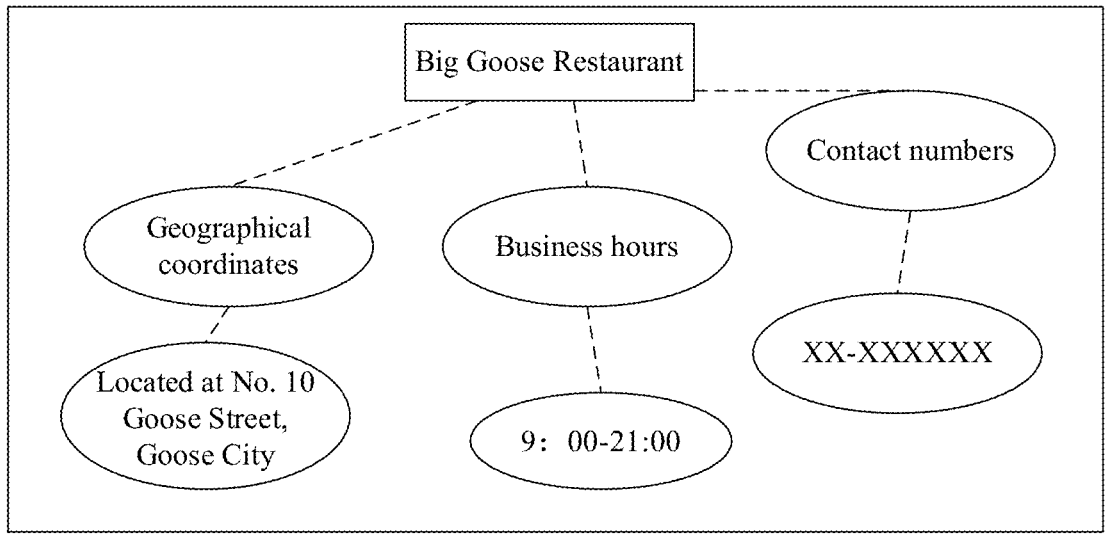

First, the construction process includes obtaining inherent data about "Big Goose Restaurant" in a map database: the geographic coordinates are "located at No. 10 Goose Street, Goose City", the business hours are "9:00-21:00", and contact numbers are "XX-XXXXXX", and constructing a first knowledge graph as shown in FIG. 4B.

Figure 4C:
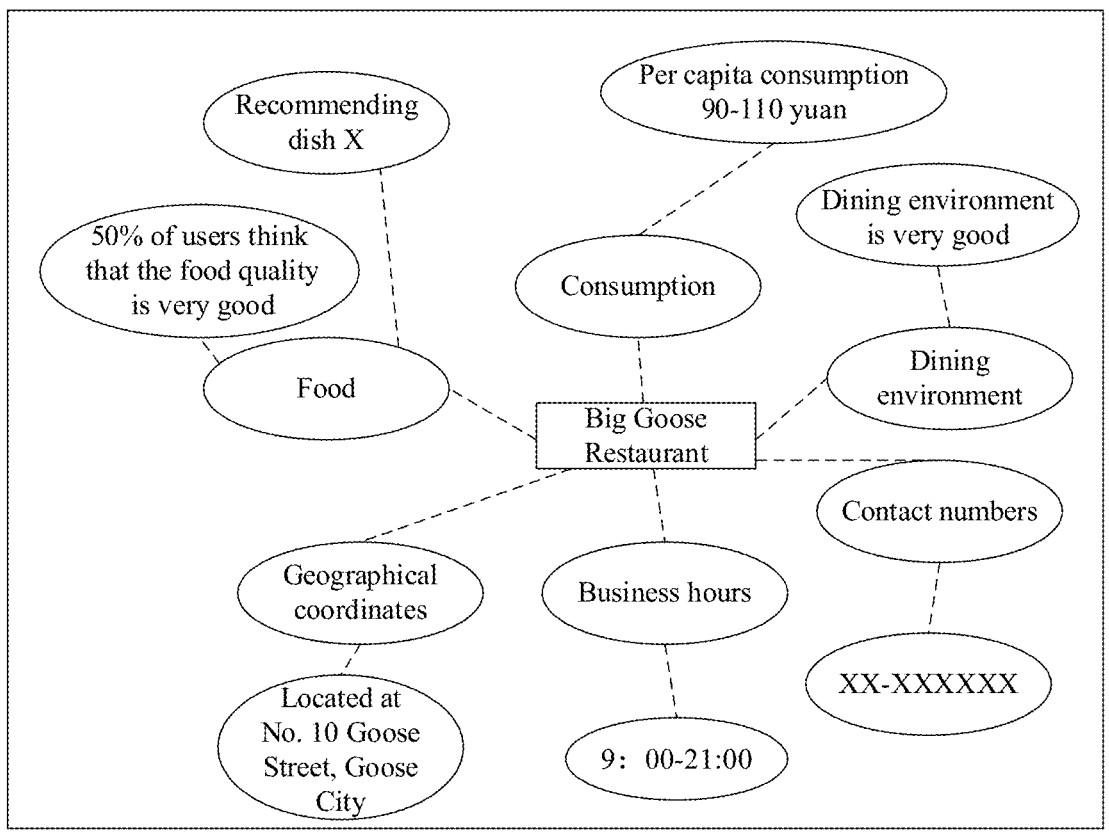
Figure 4D:
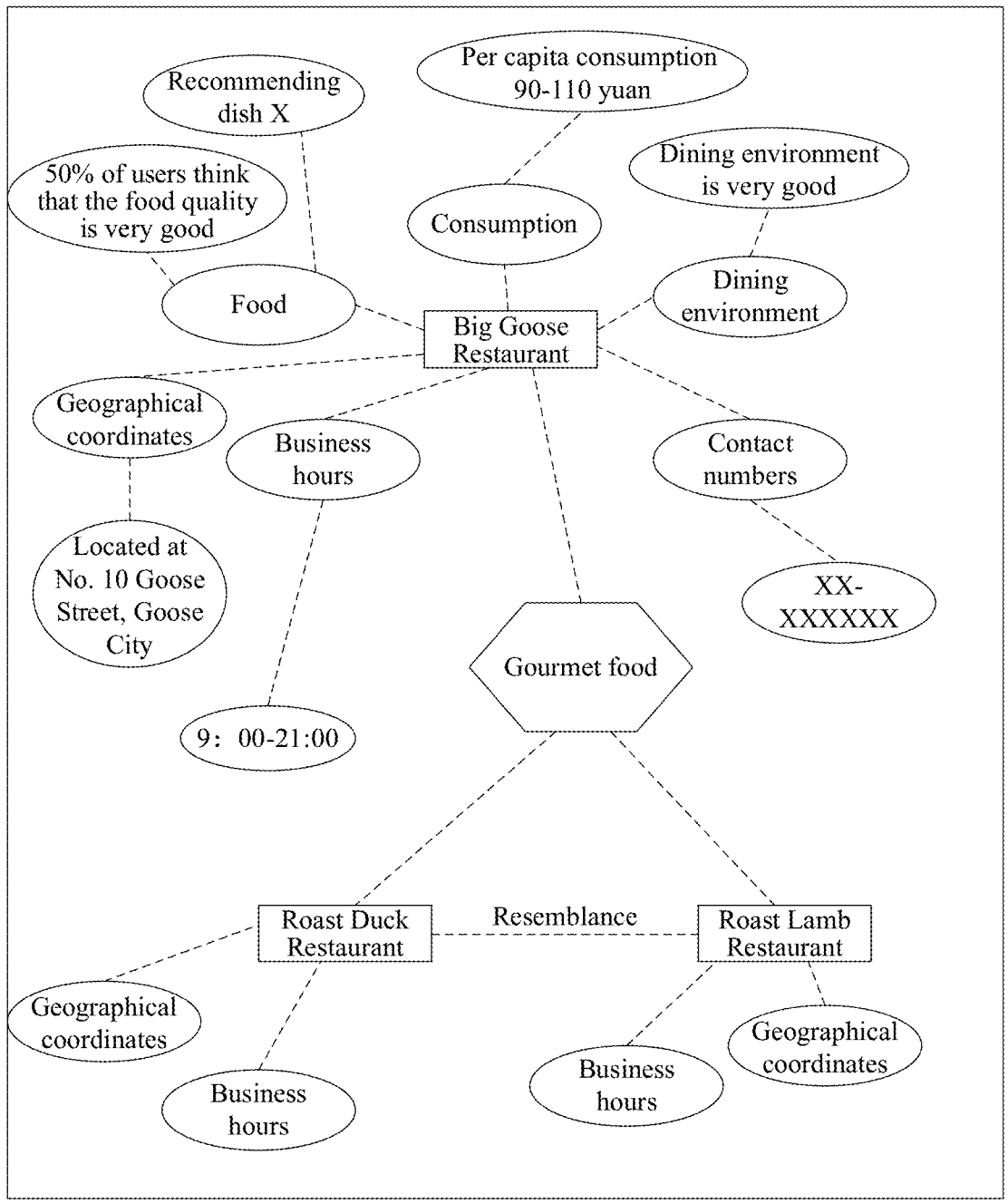

Then, adding dynamic data nodes of three information types of "food, "consumption" and "dining environment" to the first knowledge graph, and after obtaining dynamic data "Historical user B: The quality of the food is very good, especially recommending dish X, the per capita consumption is 110 yuan", "Historical user C: The per capita consumption is 90 yuan, the environment is average", "Historical user D: The food quality is average, the environment is very good" corresponding to the target object, adding "50% of users think that the food quality is very good" and "Recommending dish X" corresponding to "food", adding "per capita consumption 90-110 yuan" corresponding to "consumption" and adding "dining environment is very good" corresponding to "dining environment", constructing a second knowledge graph as shown in FIG. 4C, correspondingly, a knowledge graph composed of the second knowledge graphs with different target objects may be as shown in FIG. 4D.

Figure 4E:
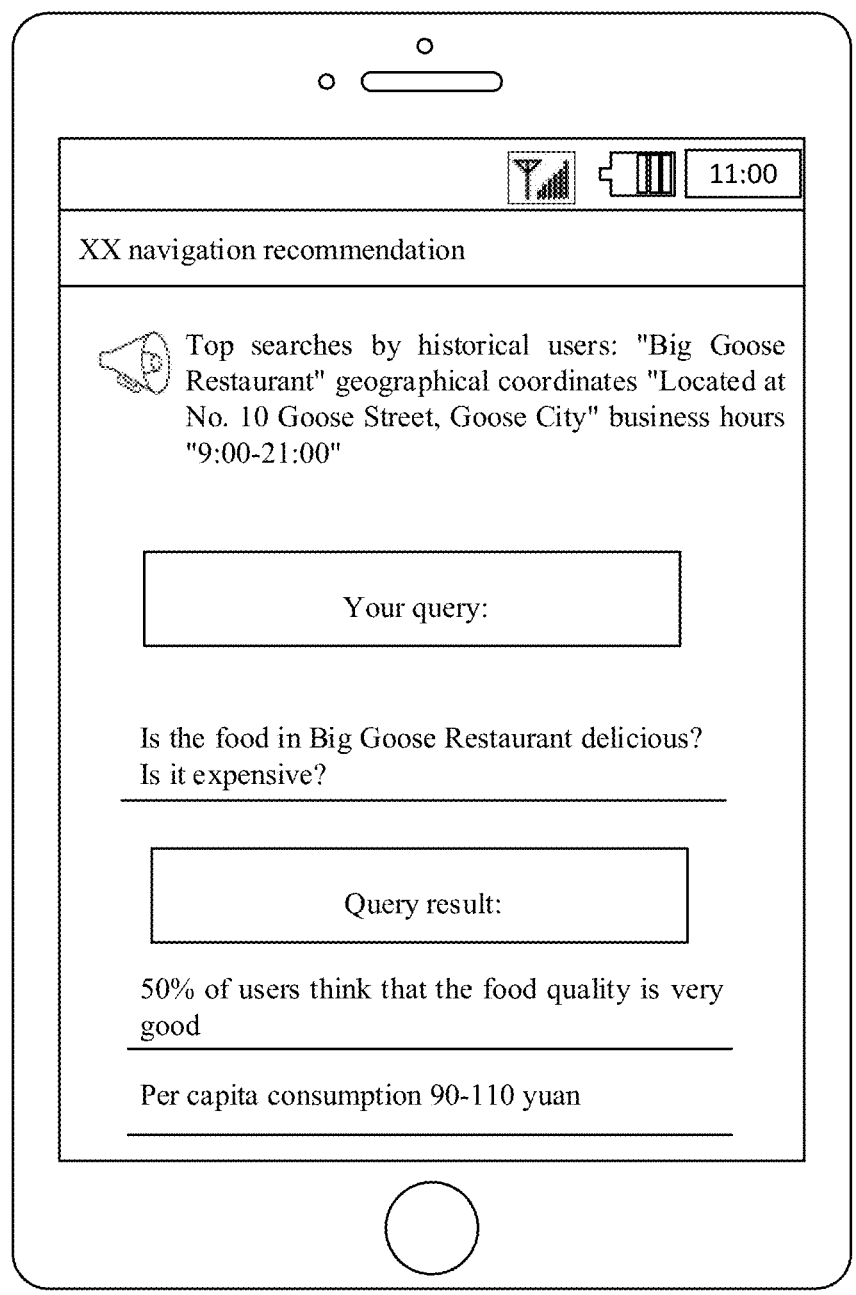

In the candidate answers "50% of users think that the food quality is very good", "Recommending dish X" and "per capita consumption 90-110 yuan", the target answers "50% of users think that the food quality is very good" and "per capita consumption 90-110 yuan" whose matching degree with the query target "food quality and price at Big Goose Restaurant" exceeds a preset threshold. The target answers "50% of users think that the food quality is very good" and "per capita consumption 90-110 yuan" are sent to the user A, and presented on the terminal device A used by the user A as shown in FIG. 4E.

Figure 5:
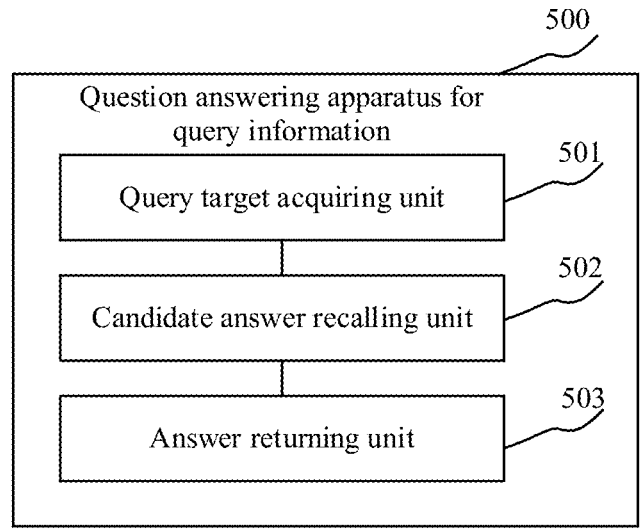
FIG. 5 is a structural block diagram of an question answering apparatus for query information according to an embodiment of the present disclosure.
Figure 6:
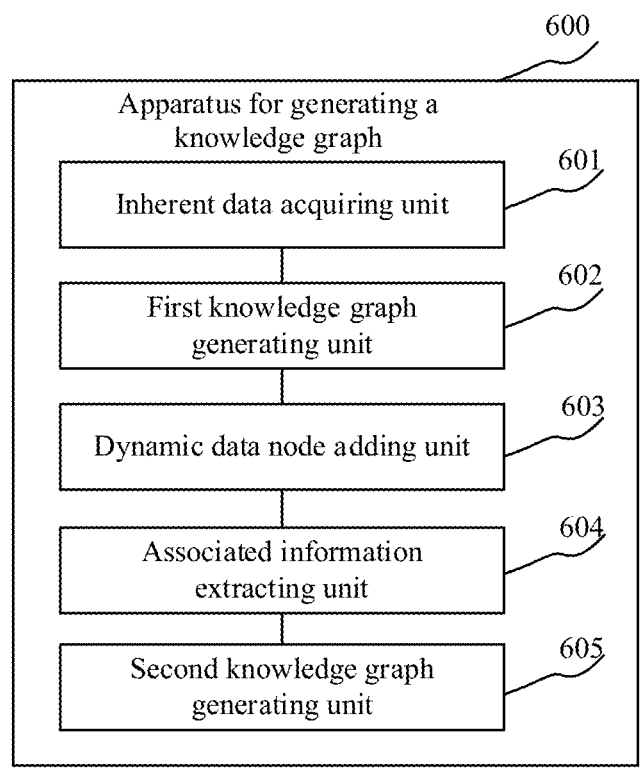
FIG. 6 is a structural block diagram of an apparatus for generating a knowledge graph according to an embodiment of the present disclosure.

With further reference to FIG. 5 and FIG. 6, as an implementation of the methods shown in the above figures, embodiments of the present disclosure provides a question answering apparatus for query information and an apparatus for generating a knowledge graph, respectively, The embodiment of the question answering apparatus for query information corresponds to the embodiment of the question answering method for query information shown in FIG. 2, and the embodiment of the apparatus for generating a knowledge graph corresponds to the embodiment of the method for generating a knowledge graph shown in FIG. 3. The above apparatuses may be applied to various electronic devices.

As shown in FIG. 5, an apparatus 500 for answering query information in the present embodiment may include: a query target acquiring unit 501, a candidate answer recalling unit 502 and an answer returning unit 503. The query target acquiring unit 501 is configured to receive query information input by a user, and analyze a query target included in the query information. The candidate answer recalling unit 502 is configured to recall candidate answers from a pre-generated knowledge graph based on the query target, where the knowledge graph is constructed based on inherent data in a map database and dynamic data of historical users, and the dynamic data includes at least one of comment data, search data, or spatiotemporal big data. The answer returning unit 503 is configured to return, in response to that there is a target answer whose matching degree with the query target exceeds a preset threshold in the candidate answers, the target answer to the user.

In the present embodiment, in the question answering apparatus for query information 500: for the specific processing and the technical effects of the query target acquiring unit 501, the candidate answer recalling unit 502 and the answer returning unit 503, reference may be made to the relevant descriptions of steps 201 to 203 in the corresponding embodiment of FIG. 2 respectively, and detailed description thereof will be omitted.

In some alternative implementations of the present embodiment, the question answering apparatus for query information 500 further includes: a query information pushing unit, configured to push, in response to that there is no target answer whose matching degree with the query target exceeds the preset threshold in the candidate answers, the query information to an expert user; and a recommended answer returning unit, configured to return a recommended answer returned by the expert user based on the query information to the user.

In some alternative implementations of the present embodiment, the question answering apparatus for query information 500 further includes: a knowledge graph updating unit, configured to analyze an information type of the query information, and add an analyzing result of the information type of the query information corresponding to the recommended answer to a second knowledge graph.

In some alternative implementations of the present embodiment, the question answering apparatus for query information 500 further includes: a recommendation information generating unit, configured to generate, in response to that the same query target is input by a plurality of different historical users within a preset period respectively, recommendation information based on the query target and the corresponding target answer; and a recommendation information sending unit, configured to send the recommendation information to the user.

In some alternative implementations of the present embodiment, the question answering apparatus for query information 500 further includes: a popularity information recording unit, configured to obtain the number of query targets corresponding to each piece of the recommendation information, and generate popularity information of each piece of the recommendation information; and the recommendation information sending unit is further configured to: sort each piece of the recommendation information based on the popularity information, and push each piece of the recommendation information sequentially to the user according to a sorting result.

As shown in FIG. 6, an apparatus 600 for generating a knowledge graph in the present embodiment may include: an inherent data acquiring unit 601, a first knowledge graph generating unit 602, a dynamic data node adding unit 603, an associated information extracting unit 604 and a second knowledge graph generating unit 605. The inherent data acquiring unit 601 is configured to extract inherent data of each target object from a map database, where the inherent data includes at least one of contact numbers, business hours, geographic coordinates, or an industry of the target object. The first knowledge graph generating unit 602 is configured to generate a first knowledge graph corresponding to each target object using the inherent data corresponding to each target object. The dynamic data node adding unit 603 is configured to add dynamic data nodes of at least one information type to each first knowledge graph. The associated information extracting unit 604 is configured to obtain dynamic data corresponding to the target object, and extract associated information from each piece of the dynamic data based on the information type, where the dynamic data includes at least one of comment data of historical users, search data, or spatiotemporal big data, and content included in the associated information is related to the information type. The second knowledge graph generating unit 605 is configured to add the information type corresponding to the associated information to each of the first knowledge graph to generate a second knowledge graph.

In the present embodiment, in the apparatus 600 for generating a knowledge graph: for the specific processing and the technical effects of the inherent data acquiring unit 601, the first knowledge graph generating unit 602, the dynamic data node adding unit 603, the associated information extracting unit 604 and the second knowledge graph generating unit 605, reference may be made to the relevant descriptions of steps 301 to 305 in the corresponding embodiment of FIG. 3 respectively, and detailed description thereof will be omitted.

In some alternative implementations of the present embodiment, the apparatus 600 for generating a knowledge graph further includes: a keyword acquiring unit, configured to obtain keyword information corresponding to each of the dynamic data nodes; and the associated information extracting unit, includes: a dynamic data word segmentation subunit, configured to obtain the dynamic data corresponding to the target object, and perform word segmentation process on each piece of the dynamic data; and an associated information extraction subunit, configured to extract, in response to that a word segmentation result of the dynamic data comprises the keyword information, the dynamic data as the associated information of the information type of the dynamic data nodes corresponding to the keyword information.

In some alternative implementations of the present embodiment, the apparatus 600 for generating a knowledge graph further includes: a node information type determining unit, configured to determine the information type of the dynamic data nodes based on an information type of query information of the historical users.

The present embodiment exists as an apparatus embodiment corresponding to the above method embodiment. According to the question answering apparatus for query information and the apparatus for generating a knowledge graph provided by the present embodiment, the knowledge graph may be constructed based on the inherent data in the map database and the dynamic data of the historical users, so that after receiving the query information input by the user, through the high-quality knowledge graph, the query information of the user is adaptively answered, improving response efficiency and quality of question-answering to the user.

According to an embodiment of the present disclosure, the present disclosure further provides an electronic device, a readable storage medium, and a computer program product.

Figure 7:
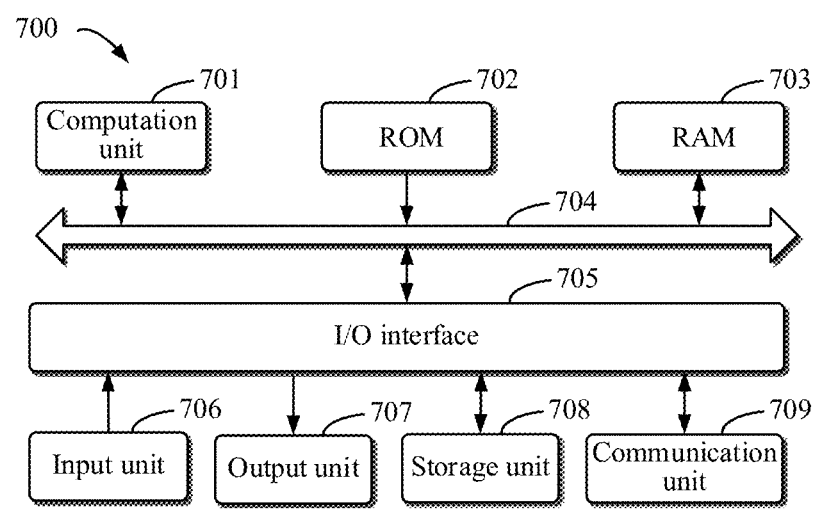
FIG. 7 is a schematic structural diagram of an electronic device adapted to perform the question answering method for query information and/or the method for generating a knowledge graph according to an embodiment of the present disclosure.

FIG. 7 illustrates a schematic block diagram of an example electronic device 700 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The parts shown herein, their connections and relationships, and their functions are merely examples, and are not intended to limit the implementation of the present disclosure described and/or claimed herein.

As shown in FIG. 7, the device 700 includes a computation unit 701, which may perform various appropriate actions and processing, based on a computer program stored in a read-only memory (ROM) 702 or a computer program loaded from a storage unit 708 into a random access memory (RAM) 703. In the RAM 703, various programs and data required for the operation of the device 700 may also be stored. The computation unit 701, the ROM 702, and the RAM 703 are connected to each other through a bus 704. An input/output (I/O) interface 705 is also connected to the bus 704.

A plurality of parts in the device 700 are connected to the I/O interface 705, including: an input unit 706, for example, a keyboard and a mouse; an output unit 707, for example, various types of displays and speakers; the storage unit 708, for example, a disk and an optical disk; and a communication unit 709, for example, a network card, a modem, or a wireless communication transceiver. The communication unit 709 allows the device 700 to exchange information/data with other devices via a computer network such as the Internet and/or various telecommunication networks.

The computation unit 701 may be various general-purpose and/or dedicated processing components having processing and computing capabilities. Some examples of the computation unit 701 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 701 performs the various methods and processes described above, such as a question answering method for query information and a method for generating a knowledge graph. For example, in some embodiments, the question answering method for query information and the method for generating a knowledge graph may be implemented as a computer software program, which is tangibly included in a machine readable medium, such as the storage unit 708. In some embodiments, part or all of the computer program may be loaded and/or installed on the device 700 via the ROM 702 and/or the communication unit 709. When the computer program is loaded into the RAM 703 and executed by the computation unit 701, one or more steps of the question answering method for query information and the method for generating a knowledge graph described above may be performed. Alternatively, in other embodiments, the computation unit 701 may be configured to perform the question answering method for query information and the method for generating a knowledge graph by any other appropriate means (for example, by means of firmware).

Various embodiments of the systems and technologies described above in this paper can be implemented in digital electronic circuit systems, integrated circuit systems, field programmable gate arrays (FPGAs), application specific integrated circuits (ASIC), application specific standard products (ASSP), system on chip (SOC), load programmable logic devices (CPLD), computer hardware, firmware, software, and/or combinations thereof. These various embodiments may include: being implemented in one or more computer programs, the one or more computer programs can be executed and/or interpreted on a programmable system including at least one programmable processor, which can be a special-purpose or general-purpose programmable processor, and can receive data and instructions from the storage system, at least one input device, and at least one output device, and transmitting data and instructions to the storage system, the at least one input device, and the at least one output device.

The program code for implementing the methods of the present disclosure may be written in any combination of one or more programming languages. These program codes can be provided to the processor or controller of general-purpose computer, special-purpose computer or other programmable data processing device, so that when the program code is executed by the processor or controller, the functions/operations specified in the flow chart and/or block diagram are implemented. The program code can be completely executed on the machine, partially executed on the machine, partially executed on the machine and partially executed on the remote machine as a separate software package, or completely executed on the remote machine or server.

In the context of the present disclosure, a machine-readable medium may be a tangible medium that may contain or store a program for use by or in combination with an instruction execution system, apparatus, or device. The machine-readable medium can be a machine-readable signal medium or a machine-readable storage medium. Machine readable media may include, but are not limited to, electronic, magnetic, optical, electromagnetic, infrared, or semiconductor systems, apparatuses, or devices, or any suitable combination of the foregoing. More specific examples of machine-readable storage media may include one or more wire based electrical connections, portable computer disks, hard disks, random access memory (RAM), read only memory (ROM), erasable programmable read only memory (EPROM or flash memory), optical fibers, compact disk read only memory (CD-ROM), optical storage devices, magnetic storage devices, or any suitable combination of the above.

In order to provide interaction with users, the systems and techniques described herein can be implemented on a computer with: a display device for displaying information to users (for example, a CRT (cathode ray tube) or LCD (liquid crystal display) monitor); and a keyboard and a pointing device (e.g., a mouse or a trackball) through which the user can provide input to the computer. Other kinds of devices can also be used to provide interaction with users. For example, the feedback provided to the user may be any form of sensor feedback (e.g., visual feedback, auditory feedback, or tactile feedback); and the input from the user can be received in any form (including acoustic input, voice input or tactile input).

The systems and techniques described herein may be implemented in a computing system including background components (e.g., as a data server), or a computing system including middleware components (e.g., an application server) or a computing system including a front-end component (e.g., a user computer with a graphical user interface or a web browser through which a user can interact with embodiments of the systems and techniques described herein), or a computing system including any combination of the back-end component, the middleware component, the front-end component. The components of the system can be interconnected by digital data communication (e.g., communication network) in any form or medium. Examples of communication networks include local area networks (LANs), wide area networks (WANs), and the Internet.

A computer system may include a client and a server. The client and the server are generally far away from each other and usually interact through communication networks. The relationship between the client and the server is generated by computer programs running on the corresponding computers and having a client server relationship with each other. The server may be a cloud server, also known as a cloud computing server or a cloud host, which is a host product in the cloud computing service system to solve the defects of large management difficulties and weak business expansion in traditional physical host and virtual private server (VPS, Virtual Private Server) services.

According to the technical solution of the embodiments of the present disclosure, the knowledge graph may be constructed based on the inherent data in the map database and the dynamic data of the historical users, so that after receiving the query information input by the user, through the high-quality knowledge graph, the query information of the user is adaptively answered, improving response efficiency and quality of answering to the user.

It should be understood that various forms of processes shown above can be used to reorder, add or delete steps. For example, the steps recorded in the present disclosure can be performed in parallel, in sequence, or in different orders, as long as the desired results of the technical solution of the present disclosure can be achieved, which is not limited herein.

The above specific embodiments do not constitute restrictions on the scope of the present disclosure. Those skilled in the art should understand that various modifications, combinations, sub combinations and substitutions can be made according to design requirements and other factors. Any modification, equivalent replacement and improvement made within the spirit and principles of this disclosure shall be included in the scope of protection of this disclosure.

What is claimed is:

1. A question answering method for query information, comprising:
receiving query information input by a user, and analyzing a query target included in the query information;
recalling candidate answers from a pre-generated knowledge graph based on the query target, wherein the pre-generated knowledge graph is constructed on the server based on inherent data in a map database and dynamic data of historical users, and the dynamic data comprises at least one of comment data, search data, or spatiotemporal big data; and
returning, in response to that there is a target answer whose matching degree with the query target exceeds a preset threshold in the candidate answers, the target answer to the user,
wherein the method further comprises:
generating, in response to the same query target being input by a plurality of different historical users within a preset period respectively, recommendation information based on the query target and the target answer;
obtaining a number of query targets corresponding to each piece of the recommendation information, and generating popularity information of each piece of the recommendation information; and
sorting each piece of the recommendation information based on the popularity information, and pushing each piece of the recommendation information sequentially to the user according to a sorting result.

2. The method according to claim 1, wherein the method further comprises:
pushing, in response to that there is no target answer whose matching degree with the query target exceeds the preset threshold in the candidate answers, the query information to an expert user; and
returning a recommended answer returned by the expert user based on the query information to the user.

3. The method according to claim 2, wherein the method further comprises:
adding the recommended answer to the pre-generated knowledge graph corresponding to the query target.

4. The method according to claim 1, wherein the pre-generated knowledge graph is constructed by:
extracting inherent data of each target object from a map database, wherein the inherent data comprises at least one of: contact numbers, business hours, geographic coordinates, or an industry of each target object;
generating a first knowledge graph corresponding to each target object using the inherent data corresponding to each target object;
adding dynamic data nodes of at least one information type to each first knowledge graph;
obtaining dynamic data corresponding to each target object, and extracting associated information from each piece of the dynamic data based on an information type, wherein content included in the associated information is related to the information type; and
adding the information type corresponding to the associated information to each first knowledge graph to generate a second knowledge graph.

5. The method according to claim 4, wherein the method further comprises:
obtaining keyword information corresponding to each of the dynamic data nodes; and
wherein extracting associated information from each piece of the dynamic data based on the information type, comprises:
performing word segmentation process on each piece of the dynamic data; and
extracting, in response to that a word segmentation result of the dynamic data comprises the keyword information, the dynamic data as the associated information of the information type of the dynamic data nodes corresponding to the keyword information.

6. The method according to claim 4, wherein the method further comprises:
determining the information type of the dynamic data nodes based on an information type of query information of the historical users.

7. An electronic device, comprising:
at least one processor; and
a memory communicatively connected to the at least one processor and configured to store instructions that, when executed by the at least one processor, cause the at least one processor to perform operations comprising:
receiving an input of query information by a user, and analyzing a query target included in the query information;
recalling candidate answers from a pre-generated knowledge graph based on the query target, wherein the pre-generated knowledge graph is constructed on the server based on inherent data in a map database and dynamic data of historical users, and the dynamic data comprises at least one of comment data, search data, or spatiotemporal big data; and
returning, in response to that there is a target answer whose matching degree with the query target exceeds a preset threshold in the candidate answers, the target answer to the user,
wherein the operations further comprise:
generating, in response to the same query target being input by a plurality of different historical users within a preset period respectively, recommendation information based on the query target and the target answer;
obtaining a number of query targets corresponding to each piece of the recommendation information, and generating popularity information of each piece of the recommendation information; and
sorting each piece of the recommendation information based on the popularity information, and pushing each piece of the recommendation information sequentially to the user according to a sorting result.

8. The electronic device according to claim 7, wherein the operations further comprise:
pushing, in response to that there is no target answer whose matching degree with the query target exceeds the preset threshold in the candidate answers, the query information to an expert user; and returning a recommended answer returned by the expert user based on the query information to the user.

9. The electronic device according to claim 8, wherein the operations further comprise:

adding the recommended answer to the pre-generated knowledge graph corresponding to the query target.

10. The electronic device according to claim 7, wherein the pre-generated knowledge graph is constructed by:

extracting inherent data of each target object from a map database, wherein the inherent data comprises at least one of: contact numbers, business hours, geographic coordinates, or an industry of each target object;

generating a first knowledge graph corresponding to each target object using the inherent data corresponding to each target object;

adding dynamic data nodes of at least one information type to each first knowledge graph;

obtaining dynamic data corresponding to each target object, and extracting associated information from each piece of the dynamic data based on an information type, wherein content included in the associated information is related to the information type; and adding the information type corresponding to the associated information to each first knowledge graph to generate a second knowledge graph.

11. A non-transitory computer readable storage medium storing computer instructions, wherein, the computer instructions are used to cause a computer to perform the question answering method for query information according to claim 1.

12. The electronic device according to claim 10, wherein the operations further comprise:

obtaining keyword information corresponding to each of the dynamic data nodes; and wherein extracting associated information from each piece of the dynamic data based on the information type, comprises:

performing word segmentation process on each piece of the dynamic data; and extracting, in response to that a word segmentation result of the dynamic data comprises the keyword information, the dynamic data as the associated information of the information type of the dynamic data nodes corresponding to the keyword information.

13. The electronic device according to claim 10, wherein the operations further comprise:

determining the information type of the dynamic data nodes based on an information type of query information of the historical users.

\* \* \* \* \*